Nov. 5, 1935.  U. KÖLM  2,019,863
TABULATING MACHINE
Filed July 29, 1932   5 Sheets-Sheet 1

INVENTOR
Ulrich Köhn
BY
W. M. Wilson
ATTORNEY

Nov. 5, 1935.  U. KÖLM  2,019,863
TABULATING MACHINE
Filed July 29, 1932  5 Sheets-Sheet 2

INVENTOR
Ulrich Kölm
BY
W. M. Wilson
ATTORNEY

Nov. 5, 1935.  U. KÖLM  2,019,863

TABULATING MACHINE

Filed July 29, 1932  5 Sheets-Sheet 3

INVENTOR
Ulrich Kölm
BY
ATTORNEY

Nov. 5, 1935.     U. KÖLM     2,019,863
TABULATING MACHINE
Filed July 29, 1932     5 Sheets-Sheet 4
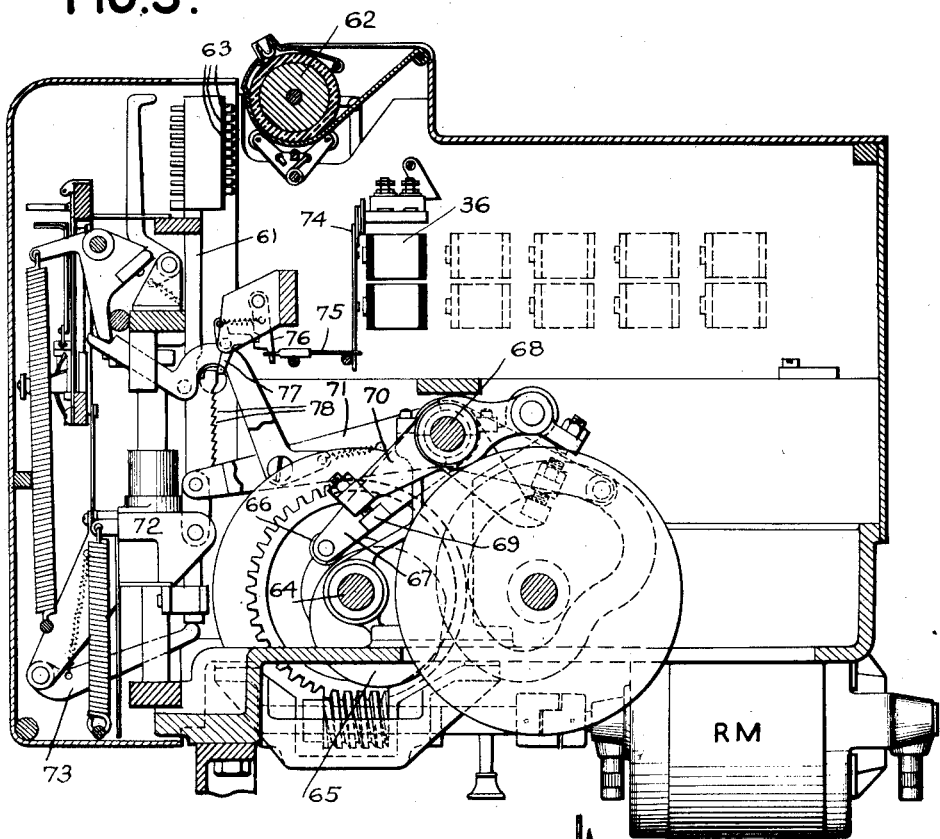
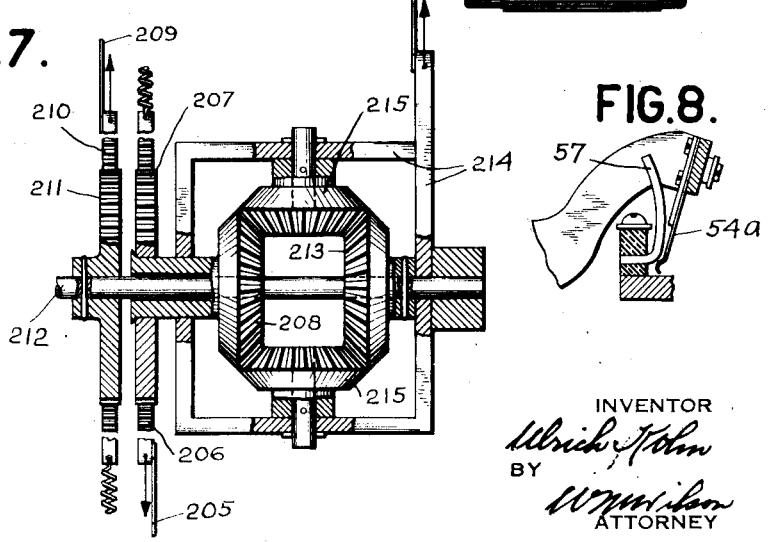
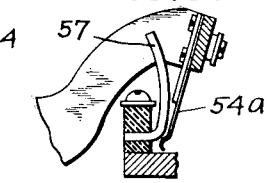
INVENTOR
Ulrich Kölm
BY
ATTORNEY

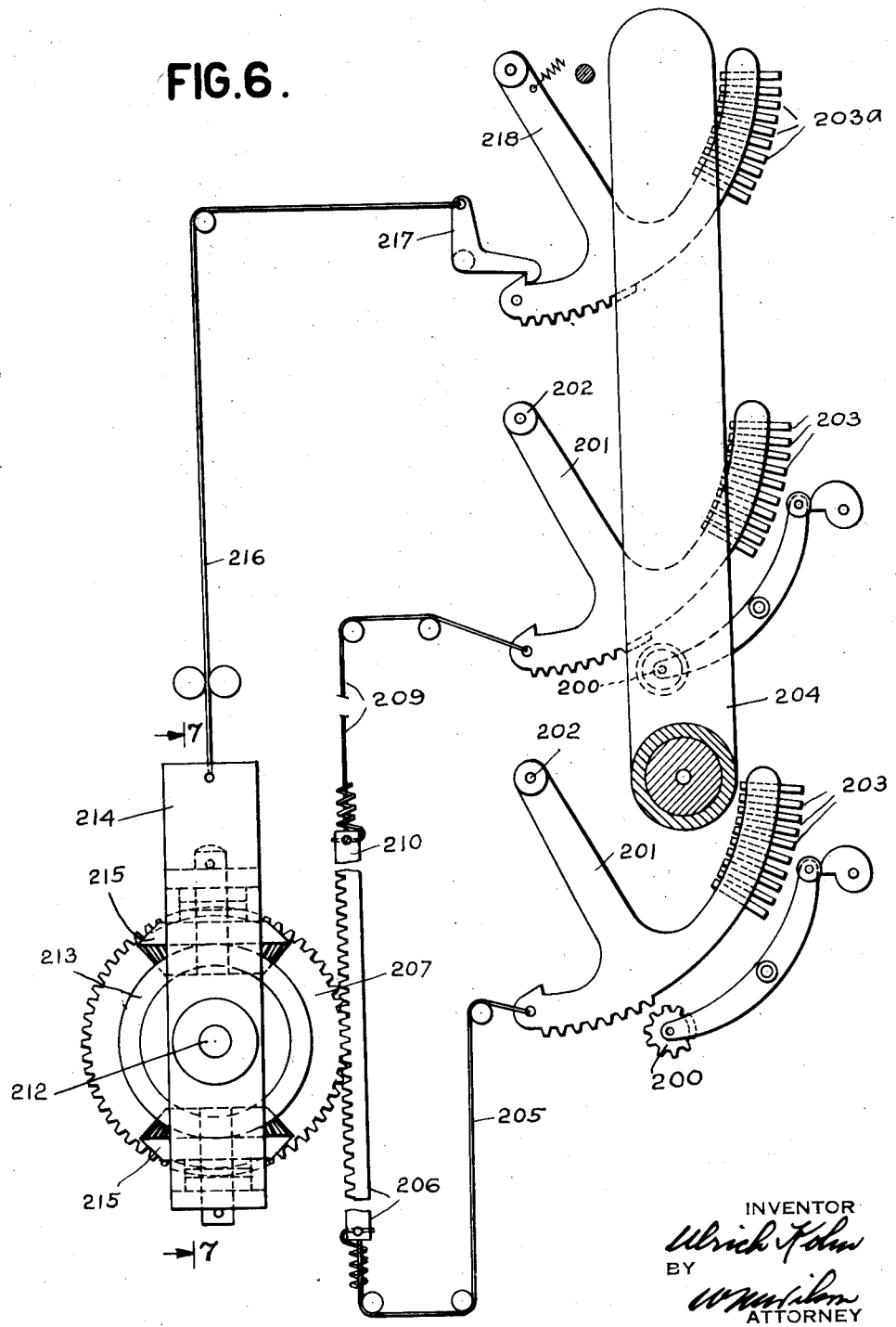

Patented Nov. 5, 1935

2,019,863

UNITED STATES PATENT OFFICE 2,019,863

TABULATING MACHINE

Ulrich Kölm, Berlin, Germany, assignor, by mesne assignments, to International Business Machines Corporation, New York, N. Y., a corporation of New York Application July 29, 1932, Serial No. 625,747
In Germany October 22, 1931

9 Claims. (Cl. 235—92)

This invention relates to accounting machines in which data on perforated record cards are summarized and the result printed on a record sheet. In certain classes of work, separate classification data are separately accumulated and it is frequently desirable to record the relationship existing between the separate results. For instance, in summarizing control accounts where certain data represent amounts received and other data represent amounts due, these amounts are separately accumulated and it may be desirable to know whether one is greater or less than the other. If both of these amounts are printed as totals, inspection will show the difference between them, if any exists but where, as in certain cases, only one of the totals is printed, there is no permanent record made of its relationship with respect to the other.

The present invention has for its principal object, therefor, the provision of devices for comparing the results of several accumulations and indicating their relationship.

A more specific object is to compare the data contained in several accumulators and indicate by a graphic representation which of the accumulators contains the greater amount.

A further object is to compare such accumulators and indicate by a graphic representation that the amounts are equal if such is the case.

Further and other objects and advantages will be hereinafter set forth in the accompanying specification and claims, and shown in the drawings, which by way of illustration show what is now considered to be the preferred embodiment of the invention, and also several modifications thereof.

In the drawings:

Fig. 5 is a cross sectional view of the printing mechanism of a well known type of tabulating machine;

Fig. 6 is a diagrammatic view showing how the object of the invention may be realized in connection with a tabulator of the mechanically operating type;

Fig. 7 is a detail sectional view taken on line 7—7 of Fig. 6;

Fig. 8 is a detail of certain total taking contacts.

Figure 1:
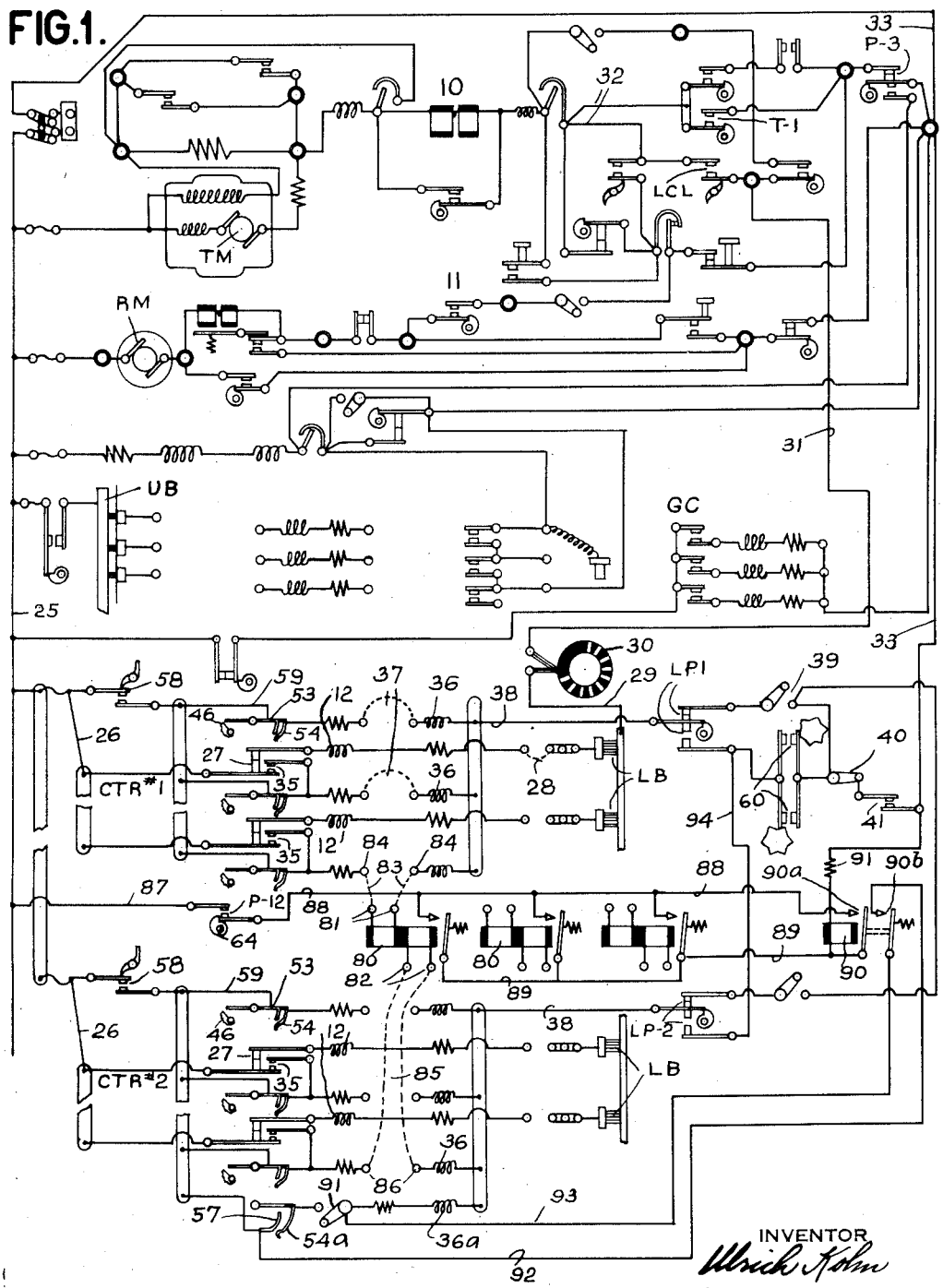
Fig. 1 is a wiring diagram of the electric circuits of a tabulating machine to which the invention may be applied.

The invention may be applied to the type of electric tabulating machine disclosed in Patent No. 1,762,145 issued to Daly and Page June 10, 1930 and also in Patent No. 1,822,594 issued to C. D. Lake, September 8, 1931. As machines of this type are well known a detailed description thereof need not be made herein, other than to briefly outline the general operation of the machine to obtain a summation of data on several counters, which summations or totals are to be compared with one another by means of the present invention.

The diagram (Fig. 1) is entirely similar to that shown in the patent to Daly and Page previously referred to. During adding operations, the machine is driven by a tabulating motor TM controlled by a group of cam and relay controlled circuits indicated at 10 and is driven during total taking operations by a reset motor RM controlled by a group of circuits, contacts and relays designated generally at 11. When the tabulating motor TM is in operation, it feeds the perforated tabulating cards, bearing differentially arranged index points representing digits, first, beneath the upper analyzing brushes UB and exactly one machine cycle later beneath the lower analyzing brushes LB. By means of the group control mechanism indicated generally at GC groups of cards as represented by the same data entry in certain selected columns, may be operated upon separately, the items of each group being accumulated and the total of them taken before the machine begins operation on the following card groups. As the perforated cards pass the lower brushes LB, their index points instantaneously close circuits through the proper lower analyzing brushes LB to energize counter magnets 12 (see also Fig. 3). A representative adding circuit may be traced as follows: from left side of line 25, wire 26, normally closed contacts 27 of CTR #1, adding magnet 12, plug connection 28 to the lower brush sockets, lower brush LB perforation in the record card, wire 29, impulse distributor 30, wire 31, lower card lever contacts LCL, wires 32, cam contacts T1, cam contacts P3 to right side of line 33. As usual, the timed energizations of these magnets 12 control mechanism for entering the data corresponding to the card reading on the counter wheels 34 (Fig. 3).

When any counter magnet 12 is energized, it causes contacts 35 (Fig. 1) to close, energizing a printer magnet 36 to select the type corresponding to the entered data, for printing. A representative circuit may be traced as follows: from left side of line 25, wire 26, contacts 35, plug connection 37, printer magnet 36, wire 38, upper contacts LP1, switch 39 (closed if listing is desired) switch 40, contacts 41, (closed during printing operations) and thence to right side of line 33. In this fashion, the accumulated items may be listed. These functions do not enter specifically into the present invention and will not be described in detail as they are well understood and fully described and explained in the patents previously mentioned.

Figure 3:
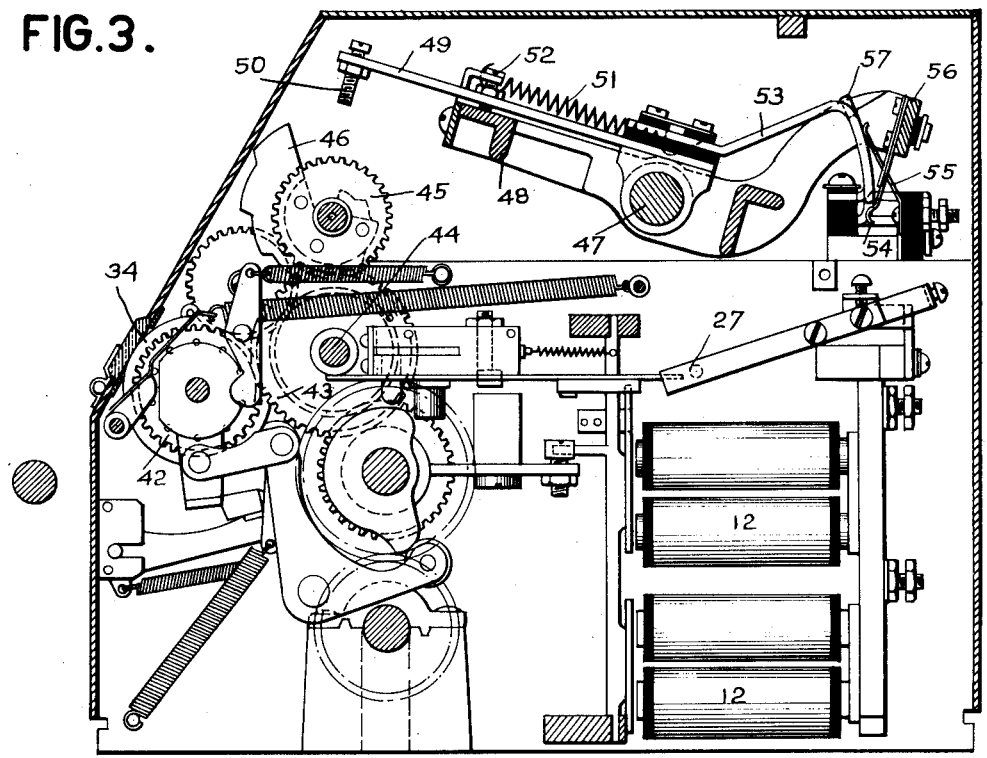
Fig. 3 is a cross sectional view of a well known Hollerith accumulator.

Referring now to Fig. 3, the counter wheels 34 are integral with gears 42, driven by gears 43 carried by a shaft 44 and driven therefrom under control of the counter magnets 12 as previously stated. As usual, the counter wheels 34 are provided with indications so that the data entered thereon may be visually indicated. Also driven from the gear 43 is a gear 45 of which one is provided for each counter wheel 34. Attached to each gear 45 is the usual stepped cam 46 provided with ten steps, one for each of the ten positions which the indicating counter wheel 34 may assume.

During total taking operations, the shaft 47 is rocked in a counterclockwise direction in synchronism with the elevation of the printing type bars. Carried by this shaft is a rocking frame 48. Loosely mounted on the shaft 47, are a number of feeler fingers 49 provided with suitable adjusting screws 50 upon their ends. These feeler fingers are connected with the frame 48 by means of springs 51 and their adjustment relatively to the frame may be made by means of screws 52.

As the frame 48 rocks counterclockwise, the feeler fingers 49 follow the frame, remaining in contact therewith until the adjustment screws 50 come into contact with the stepped cams 46 which are associated with the counter wheels. Subsequently, frame 48 continues its movement, the feeler fingers and associated parts remaining stationary. Attached to each feeler finger and insulated therefrom is a curved contact member 53. Disposed to the right of this contact member 53 are blade contacts 54 and 55, the former being carried by a common bar 56 attached to and insulated from the frame 48 and the latter being individually supported by a transverse bar of insulating material. During the downward rocking of the fingers 49, the blade contacts 54 will remain out of contact with the curved contact surface 53 until the feeler fingers are arrested. Immediately thereafter, contact is made between 54 and 53 and thus blade 54 is electrically connected with blade contact 55 which is always in contact with 53. These parts thus constitute a means for timing the closure of the circuits to the printer magnets when a total printing is to be taken.

In addition to the contact blades described, there is an additional contact blade 54a (Fig. 8) and a fixed contact bar 57 for controlling the printing of an asterisk or other special designation. The parts just described are diagrammatically represented in the circuit diagram (Fig. 1) on which a representative total printing circuit may be traced as follows: from left side of line 25, through zero button contacts 58, (which are closed when total printing is desired from the associated counter) wire 59, contact blade 53, contact blade 54, plug wire 37, print magnet 36, wire 38, lower contacts LP1, (closed during total printing operations) cam contacts 60, switch 40, contacts 41 to right side of line 33 as before.

In Fig. 5 is shown the printing mechanism through which the type bar 61 is positioned relatively to the platen 62 to bring the proper type 63 into printing position opposite the platen. The total shaft 64, driven by the reset motor RM, is provided with a cam 65 cooperating with a roller 66 carried on arm 67 freely rotatable on shaft 68. As the cam rotates, arm 67 rocks clockwise and a lug 69 cooperating with an arm 70 fixed to shaft 68 also rocks clockwise. An arm 71, fixed to shaft 68, is link-connected to printing crosshead 72 which serves to raise the type bars 61 in synchronism with the total taking operation, so that the type 63 successively pass printing position opposite platen 62. Owing to spring operated scissors connection 73, however, the type bars 61 may be arrested in any printing position without interfering with the upward movement of the crosshead 72. The type bar is arrested under control of the printing magnet 36. When this is energized, it attracts its armature 74 and pulls a call wire 75 to the right, thereby releasing a latch member 76 normally holding stop pawl 77. When the pawl 77 is so released, it is spring operated to engage ratchet teeth 78 formed on the type bar 61 to prevent further upward movement of the type bar, thus holding a particular type 63 in printing position.

The mechanism and circuits just described and traced are set forth in more particular detail in the patents mentioned to which reference may be had for further detailed disclosure and since such mechanism forms no part of the present invention further explanation thereof is not necessary here.

It has been briefly pointed out how data may be read from record cards and entered into the accumulating mechanism from whence circuits are completed to control the printing of such entered data. It has also been pointed out how, during total taking operations, the accumulated data may be read from the accumulators and caused to control printing operations to record such totals. If the detailed listing of the individually entered items is not desired, switch 39 may be opened so that the separate items are accumulated but not printed and printing will only take place during total taking operations. This arrangement is in accordance with the well known method of operating tabulating machines of this character.

The specific details of the present improvements in the machine will now be explained.

In Fig. 1, two counters have been shown and indicated generally as counter CTR #1 and CTR #2. A plurality of differential relays 80 are provided, one for each order of the accumulator. One winding of relay 80 is connected to plug sockets 81 and the other winding is connected to plug sockets 82. These sockets may be connected by suitable plug wires 83 to plug sockets 84 connecting the associated winding of relay 80 in series with a printer magnet 36 of CTR #1 while plug sockets 82 may be connected through plug wires 85 to plug sockets 86 connecting the associated winding in series with printer magnet 36 of the corresponding denominational order of CTR #2. In a similar manner each of the relays 80 may have one of its windings connected in series with each of the denominational orders of CTR #1 and its other winding in series with the corresponding denominational orders of CTR #2.

It is, therefore, apparent that any circuit through a printing magnet 36 will also energize its series connected winding of the associated relay 80. If both windings of a relay 80 are simultaneously energized the relay will fail to attract its armature and consequently fail to close its associated contact points. If, however, one of the windings is energized in advance of the other, so that at the same instant such winding alone is energized the contact of the relay will close and a circuit will be completed from left side of line 26 through wire 87, cam contacts P12, wire 88, closed contacts of relay 80, wire 89, relay magnet 90, resistance 91 to right side of line 33. Energization of relay 90 will cause closure of its points 90a, setting up a holding circuit for the relay 90, which may be traced from line 25, wire 87, cam contacts P12, wire 88, contacts 90a, relay 90 to line 33 as before.

Cam contacts P12 are controlled by a suitable cam carried by the total shaft 64 and are timed to close during total taking operations of the machine during the interval when the type 63 are being elevated. If the corresponding orders of counters #1 and #2 complete their total printing circuits to their respective magnets 36 at the same time, indicating that both orders contain the same number, the associated relay 80 does not attract its armature. As, for example, if, in a particular order, both counter wheels stood at "6", then both printing magnet circuits would be simultaneously completed at the proper time in the cycle of operations to intercept the "6" type 63 in printing position and both windings of the associated relay 80 would be simultaneously energized.

If, however, the corresponding denominational orders of the two counters did not agree in their setting the one having the greater value would complete its printing circuit in advance of the other and would cause the associated relay 80 to close its contact points and energize relay magnet 90. Since relay 90 sets up a holding circuit for itself, the subsequent energization of the second coil of relay 80 associated with the order having a lower value, while it would cause opening of the contact points of the relay 80, would not affect the holding circuit set-up of magnet 90.

As previously pointed out, blade 54a and bar 57 are normally in spaced relationship and their usual function during normal tabulating operations is to complete a circuit to a related printing magnet 36a to cause printing of an asterisk to indicate that the printed item is a total. In the present invention, a switch 91 is provided which, when open, as shown prevents this normal operation. Wires 92 and 93 are provided, which short circuit blades 57, 54a and connect points 90b of relay 90 in series with asterisk-printing magnet 36a. When relay 90 is energized and points 90b close, a circuit may be traced as follows: From line 25, zero button contacts 58 of CTR #2, wire 92, relay points 90b, wire 93, print magnet 36a, wire 38, lever contacts LP2, wire 94, contacts 60, switch 40, contacts 41 to line 33. The type bar controlled by magnet 36a carries a plurality of asterisk type in place of the numeral type on the other bars, and if magnet 36a is energized, its bar will be interrupted and an asterisk printed therefrom as an indication that the amounts in counters #1 and #2 are unlike.

Figure 2:
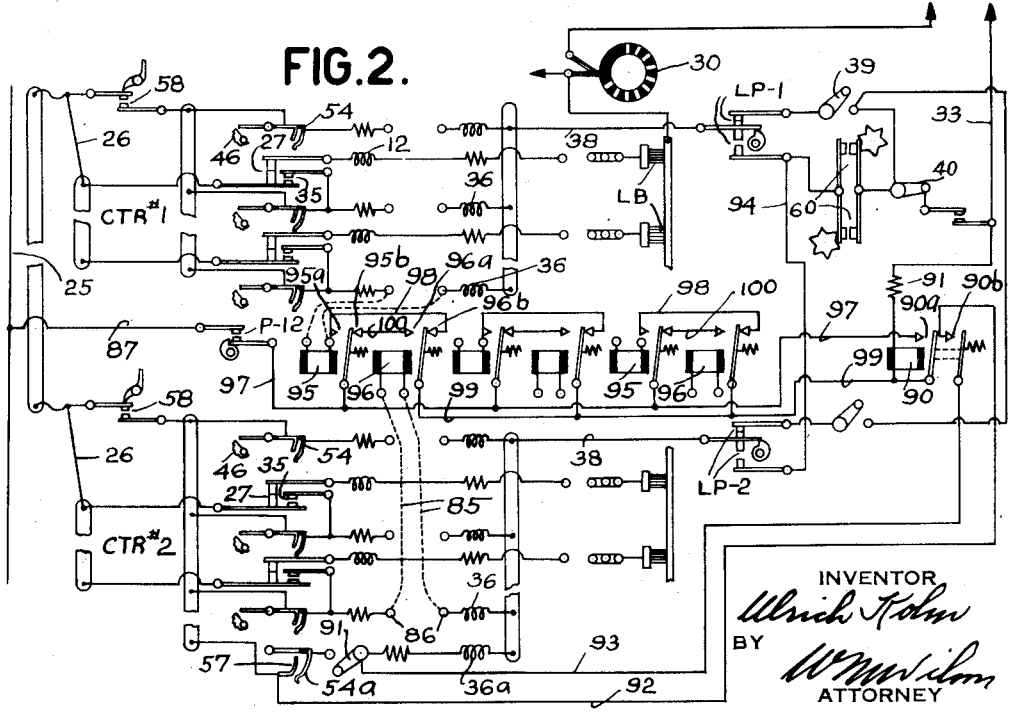
Fig. 2 is a modified form of circuit diagram showing another arrangement of the circuits employed in carrying out the invention.

Fig. 2 shows the manner in which the same result may be accomplished with the use of two independent relays in place of the differential relay of Fig. 1. Relay 95 may be plug connected in series with a print magnet 36 of counter #1 and relay 96 may be plug connected in series with a corresponding magnet 36 of counter #2. If both relays are simultaneously energized, no circuit is completed through their points. If relay 95 is energized alone and in advance of relay 96 a circuit may be traced as follows: From line 25, wire 87, contacts P12, wire 97, relay points 95a (now closed), wire 98, relay points 96b, wire 99, relay 90, resistance 91 to line 33. The holding circuit is then completed from line 25, wire 87, contacts P12, wire 97, points 90a, relay 90, resistance 91 to line 33.

If relay 96 is energized alone and in advance of relay 95 a circuit may be traced as follows: From line 25, wire 87, contacts P12, wire 97, relay points 95b, wire 100, relay points 96a (now closed), wire 99, relay 90, resistance 91 to line 33. The holding circuit will again be completed and points 90b will control magnet 36a to print the special character to indicate a disagreement in the two amounts.

Figure 4:
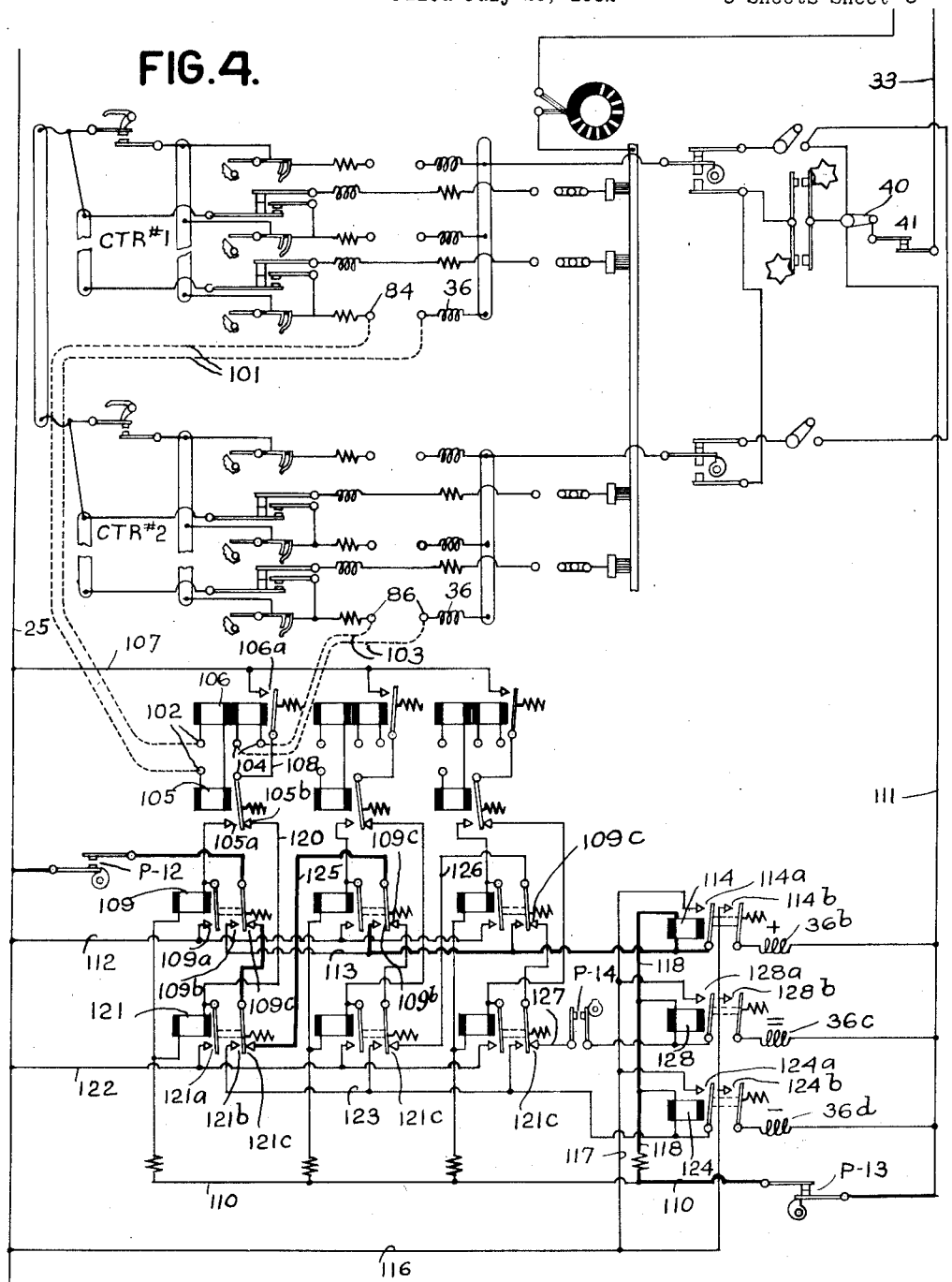
Fig. 4 is a circuit diagram of a modification of the invention.

Fig. 4 discloses an arrangement in which several special printing magnets may be controlled to indicate the various relationships that may exist between the amounts in the two counters. A magnet 36b when energized will interrupt its related type bar to print a symbol to indicate that the amount in counter #1 is greater, magnet 36c will interrupt its type bar to print a symbol indicating that the two amounts are equal and magnet 36d will interrupt its type bar to print a symbol indicating that the amount in counter #2 is greater.

Plug sockets 84 of CTR #1 may be connected by suitable plug connections 101 to plug sockets 102 and the sockets 86 of the corresponding denominational order of CTR #2 may be connected by plug connections 103 to sockets 104. A circuit through a print magnet 36 of CTR #1 will therefore, in the now familiar manner, also energize relay magnet 105 and the left hand winding of a differential relay 106. A circuit through a print magnet of CTR #2 will energize the right hand winding of differential relay 106.

The operation may best be understood by assuming a specific condition; thus, considering the amount in an order of CTR #1 to be greater, relay coil 105 and the left hand winding of relay 106 will be energized and will cause closure of relay points 105a and 106a respectively. A circuit may thereupon be traced from line 25, wire 107, points 106a, wire 108, points 105a, relay 109, wire 110, cam contact P13, wire 111, switch 40, contacts 41 to line 33. Energization of relay 109 will close its points 109a to set up a holding circuit for the relay 109 as follows: From line 25, wire 112, points 109a, relay 109, wire 110, contacts P13 to line 33 as before. This circuit will remain energized until contact P13 opens near the end of the total printing operations.

Closure of points 109b, coincident with closure of points 109a, establishes a circuit from line 25, cam contacts P12, points 109b, wire 113, coil 114, wire 118, wire 110, contacts P13 to line 33. Relay 114 closes its points 114a and a holding circuit extends from line 25, wire 116, wire 117, points 114a, relay 114, wire 118, wire 110, contacts P13 to line 33.

Closure of points 114b will complete the circuit to print magnet 36b as follows: From line 25, wire 116, wire 119, points 114b, magnet 36b, wire 111, switch 40, contacts 41 to line 33.

In this fashion magnet 36b is caused to interrupt its related type bar to print any suitable symbol such as a plus sign to indicate that counter #1 contains the higher amount.

Assume now, that the amount in CTR #2 is greater. The right hand winding of relay 106 will consequently be energized as explained above, causing closure of points 106a and completion of a circuit as follows: From line 25, wire 107, points 106a, wire 108, points 105b, wire 120, relay 121, wire 110 to line 33 as described. Points 121a close to set up a holding circuit from line 25, wire 122, points 121a, relay 121, wire 110, contacts P13 to line 33. Points 121b close to establish a circuit from line 25, contacts P12, points 109c, points 121b, wire 123, relay 124, wires 118, 110, contacts P13 to line 33. In the same manner as relay 114, relay 124 closes its points 124a and 124b to establish a holding circuit and to energize magnet 36d, respectively.

Assume now that both amounts are alike in a particular denominational order. Both windings of relay 106 will be energized simultaneously and consequently points 106a will remain open. Toward the end of the reading out operation of the total taking mechanism, i. e., when the stepped cam feelers 49 are in zero reading position, a cam contact P14 will close momentarily, setting up a circuit as follows: From line 25, cam contacts P12, points 109c, points 121c of the first order on the left, wire 125, points 109c and 121c of the second order, wire 126, points 109c and 121c of the third order, wire 127, contacts P14, relay 128, wires 118, 110, contacts P13 to line 33.

This circuit will only be completed in the event that none of the relays 105 and 121 have become energized during the sensing of the stepped cam positions 9 to 0. If any such have been energized, due to an inequality in the amounts, one or more of the points 109c and 121c will be open at the time contacts P14 close and consequently the circuit to relay 128 will not be completed.

Energization of relay 128 will close its points 128a to establish the now familiar holding circuit and points 128b will complete a circuit to magnet 36c to cause printing of a sign of equality.

A brief resumé will now be given of the operation of the modification in connection with the comparison of multi-denominational figures in the two counters. For example, suppose the number 364 entered in counter #1 and 328 entered in counter #2. It will be observed that in the units order the greater digit is in counter #2, in the tens order, the greater digit is in counter #1 and in the hundreds order the digits are of equal value. Assuming that the units order of the counters are plug connected to control the relay magnets 106, 105, 109, and 121, farthest to the right in Fig. 4, the tens orders are plug connected to control the central group of relay magnets and the hundreds orders are plug connected to control the relay magnets farthest to the left. In accordance with the foregoing detailed tracing of the circuits through the plug connections 101 and 103, the various relay contacts will be positioned in accordance with the following table:

| Contacts | Hundreds CTR #1=CTR #2 | Tens CTR #1>CTR #2 | Units CTR #1<CTR #2 |
| --- | --- | --- | --- |
| 109a | Open | Closed | Open. |
| 109b | do | do | Do. |
| 109c | Closed | Open | Closed. |
| 121a | Open | do | Do. |
| 121b | do | do | Do. |
| 121c | Closed | Closed | Open. |

The setting of the contacts 109 and 121 in the hundreds order will remain undisturbed due to the like value of the digit in the counters in the hundreds order. The central set will have its contacts 109 shifted and the units set will have its contacts 121 shifted so that upon closure of cam contacts P12 following the setting of the various relays, a circuit is traceable as indicated in heavy lines on Fig. 4. This circuit follows from line 25, cam contacts P12, contacts 109c, the hundreds order contacts 121c, the hundreds order wire 125, contacts 109b of the tens order, wire 113, relay magnet 114, wires 118 and 110, cam contacts P3, to line 111. This circuit controls the operation of magnet 36b to print a plug sign indicating that the amount in counter #1 is greater than in counter #2. Inspection of the wiring connections of the various relay contacts will disclose that if the two numbers are alike, the relay magnets 109 and 121 remain undisturbed and a circuit is serially traceable through all of the contacts 109c and 121c, including cam contacts P14 to control the operation of magnet 36c to print the sign of equality. The highest denominational order showing a difference in digits will cause a branching of this circuit at such point to wire 113 if the number in counter #1 is the greater or to wire 123 if the value in counter #2 is greater.

Fig. 6 illustrates very diagrammatically a form of mechanical tabulator to which the invention may be applied. 200 represent accumulator wheels upon which amounts may be entered in a manner well known in the art. During total-taking operations of the machine, these wheels are moved into engagement with rack teeth on type bars 201 which are then permitted to rock about their pivots 202 in a counterclockwise direction, under control of the accumulator wheels 200; the distance moved being in accordance with the amount stored on the wheel. Printing type 203 will accordingly be set to print such amount on a platen 204. In Fig. 6, the lower bar 201 may be connected, as by a tape 205, guided around suitable pulleys, with a rack 206 meshing with a gear 207 (see also Fig. 7) secured to a bevel gear 208 of a differential mechanism. The upper bar 201 may be connected, as by a tape 209, with a rack 210 meshing with a gear 211 fixed on a rod 212 which also carries a bevel gear 213. Both bevel gears are supported in the cage 214 of the differential and mesh with bevel gears 215 as shown.

It is obvious that rotation of bevel gears 208 and 213 an equal distance in opposite directions will not change the position of cage 214. An unequal movement, however, will rotate the cage in one direction or the other. This is effected by movement of one of the type bars 201, greater or less than the movement of the other bar indicating different total print settings. Rotation of cage 214 will draw on a tape 216 to rock a latch 217 and release a type bar 218. Bar 218 will thereupon swing against a stop 219 and position one of its type 203a to print a symbol on platen 204 indicative of a difference in amount on bars 201.

The invention has now been explained in connection with several specific embodiments but it will be understood that many other modifications will occur to those skilled in the art which will not depart from the spirit of the invention.

What is claimed is:

1. In a machine of the class described, a pair of accumulators, means for entering items in each of said accumulators whereby the amount in one accumulator may be equal to or different than the amount in the other accumulator, total taking means for reading the totals in said accumulators, comparing means controlled thereby and means controlled by the comparing means for indicating the relationship existing between the values of the totals read from the said accumulators.

2. In a machine of the class described, accumulators and item entering means therefor, total printing circuits controlled by said accumulators to control printing of the amounts in said accumulators, a supplemental printing circuit, means for comparing the amounts in said accumulators and means controlled by said comparing means for controlling the operation of said supplemental printing circuit.

3. In a machine of the class described, accumulators and item entering means therefor, total printing circuits controlled by said accumulators to control printing of the amounts in said accumulators, a plurality of supplemental printing circuits, means for comparing the amounts in said accumulators, and means controlled thereby for selectively controlling the operation of said supplemental printing circuits to indicate the relationship existing between values of the totals read from said accumulators.

4. In a machine of the class described, a plurality of entry receiving devices, means for entering items derived from record cards, means for determining by joint reading of amounts in the devices whether an entry in one device is equal to, greater than, or less than an entry in another of said devices, printing mechanism and means controlled by said determining means for controlling the operation of said printing mechanism in different ways in accordance with the relationship between the entries in said device.

5. In a machine of the class described, a pair of accumulators, means for entering items derived from record cards, total printing circuits for printing the totals in said accumulators, means controlled by said total printing circuits for determining whether the total in one accumulator is equal to, greater than, or less than the total in the other accumulator and means controlled by said determining means for indicating whether the total in the one accumulator is equal to, greater than, or less than the total in the other accumulator.

6. In a machine of the class described, a plurality of accumulators, means for entering items derived from record cards, means for determining by joint reading of amounts in the accumulators whether an entry in one accumulator is equal to, greater than, or less than an entry in another of said accumulators and means controlled thereby for printing a distinctive symbol for each relationship.

7. In a machine of the class described, a pair of accumulators each having a plurality of denominational orders, means for entering items derived from record cards, means for separately comparing the corresponding orders of the pair of accumulators including a set-up device for each order and means including recording devices controlled thereby for indicating the relationship existing between values of the entries in said accumulators.

8. In a machine of the class described, a pair of accumulators, means for entering items in each accumulator whereby the amount in one accumulator may be equal to or different than the amount in the other accumulator, means for reading the amounts in said accumulators, a set-up device controlled by said reading means, a separate indicating device for each relationship which may exist between the values of the amounts in the accumulators and means controlled by said set-up device for selecting one of said indicating devices for operation.

9. In a machine of the class described, a pair of accumulators each settable to represent a number, a trio of circuits, comparing means for determining the relationship between the numbers set on the two accumulators, and means controlled thereby for completing one of said circuits when the numbers set are alike, the second when the number on one is greater than that on the second, and the third, when the number on said first one is less than the number on said second one.

ULRICH KÖLM.